United States Patent [19]

(12) United States Patent
Shim

(10) Patent No.: US 11,092,691 B2
(45) Date of Patent: Aug. 17, 2021

(54) SYSTEM INCLUDING BEAM STEERING DEVICE

(71) Applicant: SAMSUNG ELECTRONICS CO., LTD., Suwon-si (KR)

(72) Inventor: Dongsik Shim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 521 days.

(21) Appl. No.: 16/041,155

(22) Filed: Jul. 20, 2018

(65) Prior Publication Data

US 2019/0243000 A1 Aug. 8, 2019

(30) Foreign Application Priority Data

Feb. 2, 2018 (KR) .................. 10-2018-0013429

(51) Int. Cl.
| | |
|---|---|
| *G01C 3/08* | (2006.01) |
| *G01S 17/931* | (2020.01) |
| *G01S 7/481* | (2006.01) |
| *B60Q 9/00* | (2006.01) |
| *G01S 17/42* | (2006.01) |
| *G02B 26/10* | (2006.01) |
| *G01S 17/34* | (2020.01) |

(52) U.S. Cl.
CPC .......... *G01S 17/931* (2020.01); *B60Q 9/008* (2013.01); *G01S 7/4817* (2013.01); *G01S 17/34* (2020.01); *G01S 17/42* (2013.01); *G02B 26/10* (2013.01)

(58) Field of Classification Search
CPC ..... G02B 27/0087; G02B 26/10; G01S 17/42; G01S 17/931; G01S 17/34; G01S 7/4817; B60Q 9/008; B60C 9/008
USPC ........................................... 356/4.01
See application file for complete search history.

(56) References Cited

U.S. PATENT DOCUMENTS

| | | | |
|---|---|---|---|
| 9,081,252 B2 | 7/2015 | Aflatouni et al. | |
| 9,753,351 B2 | 9/2017 | Eldada | |
| 10,613,201 B2* | 4/2020 | Pacala | ..................... G01S 17/89 |
| 2009/0116523 A1 | 5/2009 | Leem et al. | |
| 2016/0049765 A1* | 2/2016 | Eldada | .................. G01S 7/4817 356/5.01 |
| 2017/0315420 A1* | 11/2017 | Watts | ....................... G02F 1/292 |
| 2017/0350965 A1* | 12/2017 | Schmalenberg | ...... G01S 7/4817 |
| 2018/0039153 A1* | 2/2018 | Hashemi | ................. G02F 1/292 |
| 2019/0056634 A1* | 2/2019 | Hosseini | ................. G02F 1/292 |
| 2019/0219888 A1* | 7/2019 | Sun | ........................ G02F 1/2955 |

* cited by examiner

*Primary Examiner* — Mark Hellner
(74) *Attorney, Agent, or Firm* — Sughrue Mion, PLLC

(57) ABSTRACT

A system including a beam steering device, includes a substrate, at least one light source disposed on the substrate and configured to irradiate at least one light beam, and optical phased arrays disposed on a same plane of the substrate and configured to adjust a direction of the at least one light beam that is irradiated, to output a first plurality of light beams to an object. Each of the optical phased arrays has a different view angle range. The system further includes light detecting elements configured to detect a second plurality of light beams that are reflected by the object to which the first plurality of light beams is output. The light detecting elements respectively correspond to the optical phased arrays.

13 Claims, 8 Drawing Sheets

SYSTEM INCLUDING BEAM STEERING DEVICE

CROSS-REFERENCE TO RELATED APPLICATION

This application claims priority from Korean Patent Application No. 10-2018-0013429, filed on Feb. 2, 2018, in the Korean Intellectual Property Office, the disclosure of which is incorporated herein by reference in its entirety.

BACKGROUND

1. Field

Apparatuses consistent with embodiments relate to beam steering devices capable of extending a scanning range of a light beam.

2. Description of the Related Art

Advanced driving assistance systems (ADASs) having various functions are being commercialized. For example, more and more vehicles are equipped with adaptive cruise control (ACC) according to which positions and speeds of other vehicles are detected and a speed of a vehicle being driven is reduced in the event that there is risk of collision. Otherwise, when there is no risk of collision, the vehicle is driven within a set speed range, or with an autonomous emergency braking (AEB) system according to which another vehicle in front of a vehicle or a driver is recognized and a braking system is automatically triggered to prevent collision in case the driver does not respond to the risk of collision or a method used to respond to the collision risk is not appropriate. In the near future, commercialization of automobiles allowing autonomous driving is expected.

Accordingly, optical measuring devices capable of providing information about the surroundings of a vehicle are gaining more and more attention. For example, Light Detection and Ranging (LiDAR) for vehicles irradiates a laser to a selected area around a vehicle, senses a reflected laser and provides information about a distance between the vehicle and objects around the vehicle, relative speeds, angles of directions, or the like. To this end, LiDARs for vehicles include a beam steering device steering a beam to a desired area.

To steer a laser beam to a desired position, typically, a method of mechanically rotating a portion to which a laser is irradiated and a method of using interference of a laser beam having a bundle shape, which is emitted from multiple unit cells or multiple waveguides by using an optical phased array (OPA) method, are used. According to the OPA method, a laser beam may be steered by controlling unit cells or waveguides in terms of electricity or heat.

SUMMARY

Systems including a beam steering device capable of extending a scanning range of a light beam, are provided.

Additional aspects will be set forth in part in the description that follows and, in part, will be apparent from the description, or may be learned by practice of the presented embodiments.

According to an aspect of an embodiment, there is provided a substrate, at least one light source disposed on the substrate and configured to irradiate at least one light beam, and optical phased arrays disposed on a same plane of the substrate and configured to adjust a direction of the at least one light beam that is irradiated, to output a first plurality of light beams to an object. Each of the optical phased arrays has a different view angle range. The system further includes light detecting elements configured to detect a second plurality of light beams that are reflected by the object to which the first plurality of light beams is output. The light detecting elements respectively correspond to the optical phased arrays.

Each of the optical phased arrays may be independently operated, and each of the second plurality of light beams may be detected using a respective one of the light detecting elements that corresponds to a respective one of the optical phased arrays.

Each of the optical phased arrays may include a waveguide through which the at least one light beam that is irradiated is transmitted, a beam splitter configured to split the at least one light beam transmitted through the waveguide, and a phase shifter configured to shift a phase of the at least one light beam that is split.

The system may further include an antenna including a grating configured to adjust the direction of the at least one light beam of which the phase is shifted.

Each of the optical phased arrays may include an optical amplifier configured to amplify the at least one light beam transmitted through the waveguide.

The phase shifter may include a portion of the waveguide disposed on the substrate, and a cladding layer disposed on the portion of the waveguide and configured to modulate the phase of the at least one light beam that is split, based on an electrical signal. The cladding layer may include an oxide semiconductor.

The at least one light source may be further configured to emit a laser beam having a convertible wavelength.

The at least one light source may include a plurality of lights sources respectively corresponding to the optical phased arrays.

The at least one light sources may include one light source that is jointly used with respect to the optical phased arrays.

The at least one light source may include a plurality of light sources that are combined to be used with respect to one of the optical phased arrays.

Each of the first plurality of light beams may be output to a different region adjacent to the object.

Each of the first plurality of light beams may be output along a different scanning direction on the object.

BRIEF DESCRIPTION OF THE DRAWINGS

The above and/or other aspects will become apparent and more readily appreciated from the following description of embodiments, taken in conjunction with the accompanying drawings in which.

DETAILED DESCRIPTION

Figure 1:
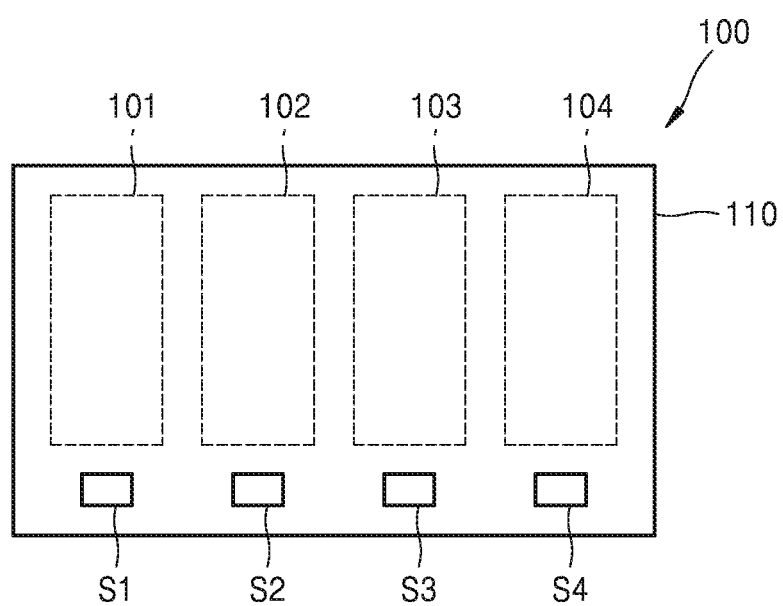
FIG. 1 is a schematic diagram of a beam steering device according to an embodiment.

Reference will now be made in detail to embodiments, examples of which are illustrated in the accompanying drawings, wherein like reference numerals refer to like elements throughout. In this regard, the present embodiments may have different forms and may not be construed as being limited to the descriptions set forth herein. Accordingly, the embodiments are described below, by referring to the figures, to explain aspects. As used herein, the term "and/or" includes any and all combinations of one or more of the associated listed items.

A beam steering device and a system including the beam steering device according to various embodiments will now be described more fully with reference to the accompanying drawings. In the drawings below, sizes of components in the drawings may be exaggerated for clarity and convenience of explanation. While terms "first" and "second" are used to describe various components, it is obvious that these components are not limited by the terms "first" and "second." The terms "first" and "second" are used only to distinguish between each component.

Singular expressions, unless defined otherwise in contexts, include plural expressions. Also, when a part "includes" an element, unless there is a particular description contrary thereto, the part can further include other elements, not excluding the other elements. When a predetermined material layer is described as being on a substrate or another layer, the material can be directly on or directly contact the substrate or the other layer, or intervening layers be present. In addition, materials of each layer in embodiments described below are examples, and other materials may also be used.

FIG. 1 is a schematic diagram of a beam steering device 100 according to an embodiment.

The beam steering device 100 includes a substrate 110, at least one light source provided on the substrate 110, and a plurality of optical phased arrays arranged on a same plane as the substrate 110.

The substrate 110 may be, for example, a silicon substrate. However, the disclosure is not limited thereto. The at least one light source may include, for example, a first light source S1, a second light source S2, a third light source S3, and a fourth light source S4. The plurality of optical phased arrays may include, for example, a first optical phased array 101, a second optical phased array 102, a third optical phased array 103, and a fourth optical phased array 104. The first optical phased array 101, the second optical phased array 102, the third optical phased array 103, and the fourth optical phased array 104 may be arranged on a same plane of one substrate 110. The optical phased arrays may be manufactured on a substrate through a semiconductor process. Here, while the embodiment in which four light sources and four optical phased arrays are included is described, different number and arrangements thereof may be applied.

An optical phased array may be configured to control an output direction of a light beam emitted from at least one light source. A plurality of optical phased arrays may have different view angle ranges. For example, the first optical phased array 101 may have a first view angle range to adjust an output direction of a light beam, and the second optical phased array 102 may have a second view angle range to adjust an output direction of a light beam. The third optical phased array 103 may have a third view angle range to adjust an output direction of a light beam, and the fourth optical phased array 104 may have a fourth view angle range to adjust an output direction of a light beam.

Figure 2:
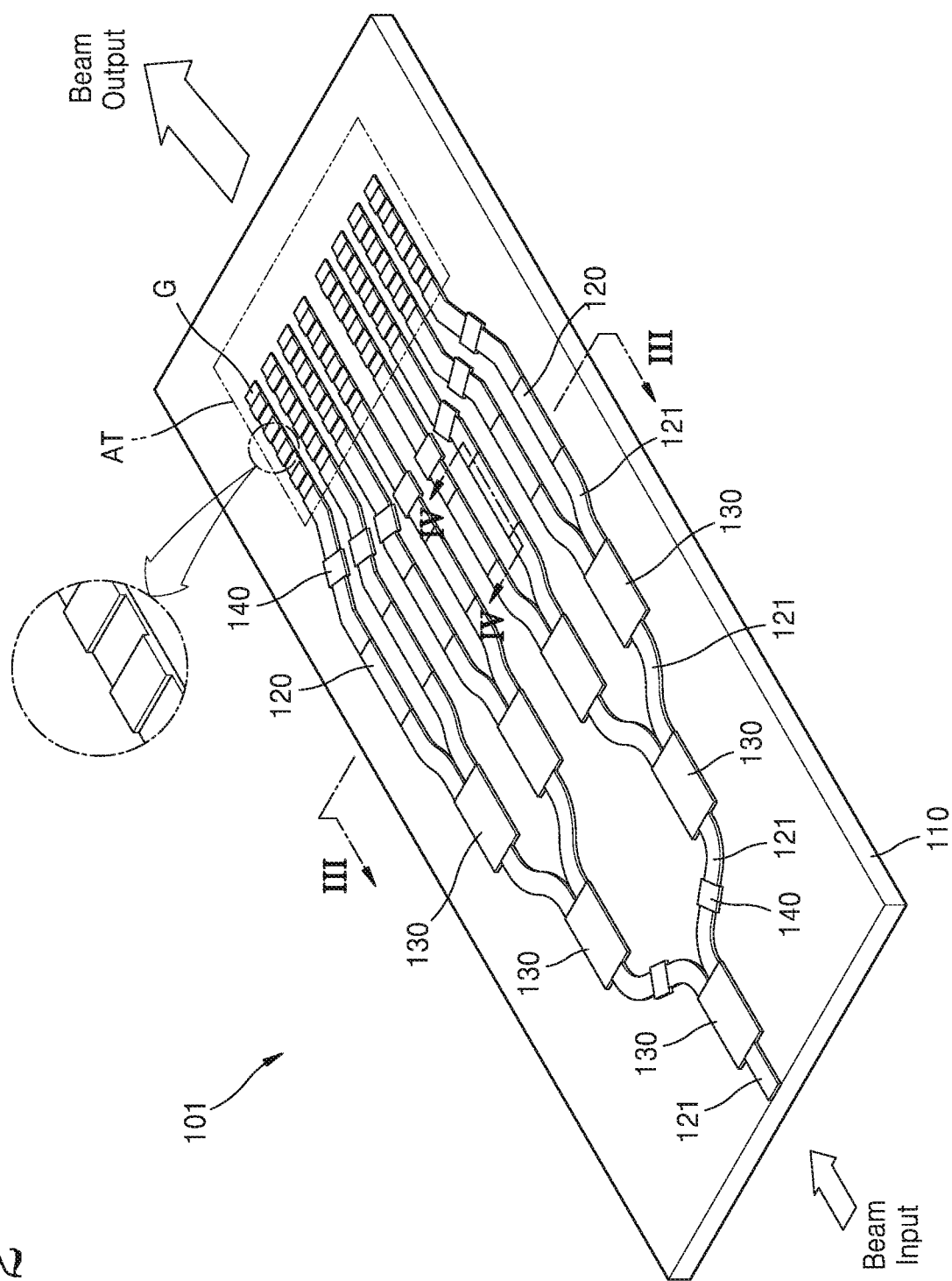
FIG. 2 is a perspective view of an optical phased array included in the beam steering device of FIG. 1.

FIG. 2 is a perspective view of the first optical phased array 101 included in the beam steering device 100 of FIG. 1. The second through fourth optical phased arrays 102, 103, and 104 may be configured identically to the first optical phased array 101.

The first optical phased array 101 includes a waveguide 121 transmitting a beam irradiated from at least one light source, a beam splitter 130 splitting the light beam transmitted through the waveguide 121, and a phase shifter 120 shifting a phase of the light beam.

The waveguide 121 through which light travels may be separated into a plurality of waveguides 121 by beam splitters 130. FIG. 2 illustrates an example in which one waveguide 121 onto which external light is incident is divided into eight waveguides 121 by seven beam splitters 130. The phase shifter 120 may be provided in the waveguides 121 separated by the beam separators 130. As an electric signal is applied, the phase shifter 120 may independently change a phase of a light beam passing through the waveguide 121.

Figure 3:
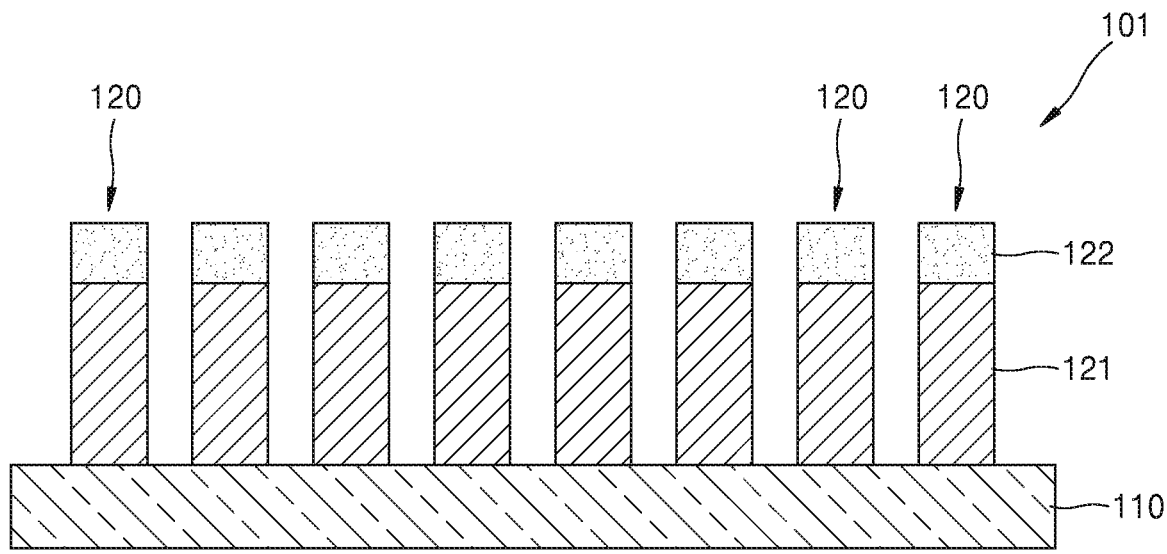
FIG. 3 is a cross-sectional view taken along line III-III of FIG. 2.
Figure 4:
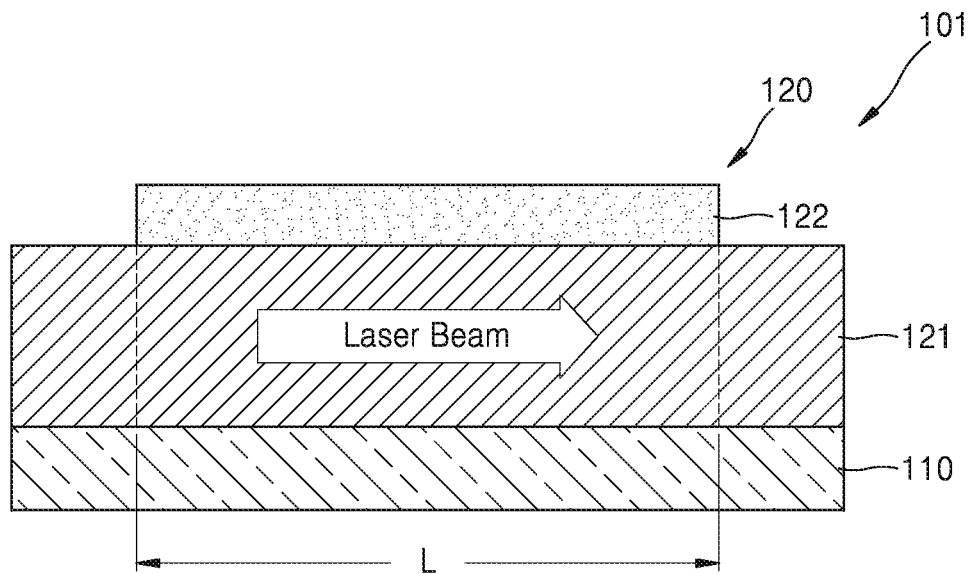
FIG. 4 is a cross-sectional view taken along line IV-IV of FIG. 2.

FIG. 3 is a cross-sectional view taken along line III-III of FIG. 2. FIG. 4 is a cross-sectional view taken along line IV-IV of FIG. 2.

Referring to FIGS. 3 and 4, each of the phase shifters 120 may include the waveguide 121 and a cladding layer 122 provided on the substrate 110.

As the substrate 110, for example, a silicon substrate may be used. However, this is an example, and the substrate 110 may include other various materials. The waveguide 121 is provided on an upper surface of the substrate 110. The waveguide 121 may include a semiconductor material. The waveguide 121 may include, for example, silicon. However, this is an example, and the waveguide 121 may include other various materials.

The cladding layer 122 is provided on an upper surface of the waveguide 121. The cladding layer 122 may be provided to modulate a phase of a light beam passing through the waveguide 121. To this end, the cladding layer 122 may include a material having a refractive index that changes according to application of an electrical signal.

The cladding layer 122 may include, for example, an oxide semiconductor. In detail, the cladding layer 122 may include a transparent conductive oxide (TCO) having a refractive index that changes relatively greatly according to application of an electrical signal. The TCO may include any one or any combination of, for example, indium-tin-oxide (ITO), indium-zinc-oxide (IZO), Ga—In—Zn-Oxide (GIZO), Al—Zn-oxide (AZO), Ga—Zn-oxide (GZO), and ZnO. However, the disclosure is not limited thereto. The cladding layer 122 may form a p-n junction structure with the waveguide 121.

When an electrical signal such as a voltage is applied to the cladding layer 122 in the phase shifter 120 through a driver, a carrier density in the cladding layer 122 at an interface between the cladding layer 122 and the waveguide 121 varies. According to the variation in the charge density, a refractive index of the cladding layer 122 may vary. When the refractive index of the cladding layer 122 varies, a phase of a light beam passing through the waveguide 121 under the cladding layer 122 may be modulated due to destructive wave interference. In FIG. 4, L represents a length of a phase modulation section, that is, a length of the phase shifter 120 according to a proceeding direction of a light beam.

Referring back to the first optical phased array 101 illustrated in FIG. 2, to which the phase shifter 120 is applied, a light beam that is incident on one waveguide 121 passes through the plurality of waveguides 121 split by the beam splitters 130, and the light beam may be irradiated to a predetermined position by interference of the emitted light beam having a bundle shape. Here, light beams passing through the waveguides 121 may be phase-shifted by the phase shifter 120 to be output, thereby determining a phase profile of the bundle-shaped light beam that is finally emitted. As a proceeding direction of light is determined based on the phase profile, the light beam may be irradiated to a desired position. The phase shifter 120 may perform scanning by adjusting the proceeding direction of the light beam. For example, the phase shifter 120 may scan a light beam in a horizontal direction with respect to the substrate 110.

Typically, to modulate a phase of a light beam passing through a waveguide, a method of varying a refractive index of the waveguide itself has been used. Here, as a method of changing the refractive index of the waveguide, a method using heat and a method using electricity are available. The method using heat involves a large phase change, and a waveguide may be formed by using various materials by using this method. However, the method using heat is slow in speed, and involves lots of interference occurring between waveguides, resulting in a distance or more between the waveguides. In addition, it is difficult to provide a broad field of view (FOV) by using the method. In addition, although the method using electricity has a high speed and creates no interference between waveguides, thus obtaining a broad FOV, this method has a small phase change, thus using a long waveguide. As a p-n or a p-i-n junction structure has to be applied to the method using electricity, a waveguide material is limited to a semiconductor material such as Si or the like, and accordingly, laser beams of various wavelengths may not be steered by using the method using electricity.

In the beam steering device 100 according to the present embodiment, each of the phase shifters 120 may include the cladding layer 122 having a refractive index that changes according to application of an electric signal, around the waveguide 121, to modulate a phase of a light beam passing through the waveguide 121. Accordingly, according to the present embodiment, a phase of a light beam passing through the waveguide 121 may be modulated by destructive wave interference by changing a refractive index of the cladding layer 122 provided around the waveguide 121, and without changing the refractive index of the waveguide 121 itself. As the refractive index of the waveguide 121 itself is not changed, beam loss is small, and various materials such as silicon and silicon nitride may be used as a material of the waveguide 121. Thus, light beams of various wavelengths may be steered. In addition, as an electrical signal other than heat is used, the beam steering device 100 according to the present embodiment has a high speed, and a distance between the waveguides 121 may be reduced. Thus, a broad field of view (FOV) may be ensured.

An antenna AT may be further provided at an end of the waveguide 121 extending from the phase shifter 120. The antenna AT may include a grating G formed in the waveguide 121. A proceeding direction of a light beam may be adjusted according to a size, depth, pitch, and the like of the grating G. The phase shifter 120 may adjust a proceeding direction of a light beam to scan the light beam in a horizontal direction with respect to the substrate 110, and the antenna AT may adjust the proceeding direction of the light beam to scan the light beam in a thickness direction with respect to the substrate 110. The thickness direction with respect to the substrate 110 may include not only a direction perpendicular to the substrate 110 but also a diagonal direction.

Referring back to FIG. 1, the first through fourth light sources S1, S2, S3, and S4 may be configured to emit light of a single wavelength or light of a plurality of wavelengths. For example, the first to fourth light sources S1, S2, S3, and S4 may include, for example, a laser diode (LD), a light-emitting diode (LED), a super luminescent diode (SLD) or a tunable laser diode (TLD).

For example, a TLD may be used as a light source emitting light of a plurality of wavelengths.

Figure 5:
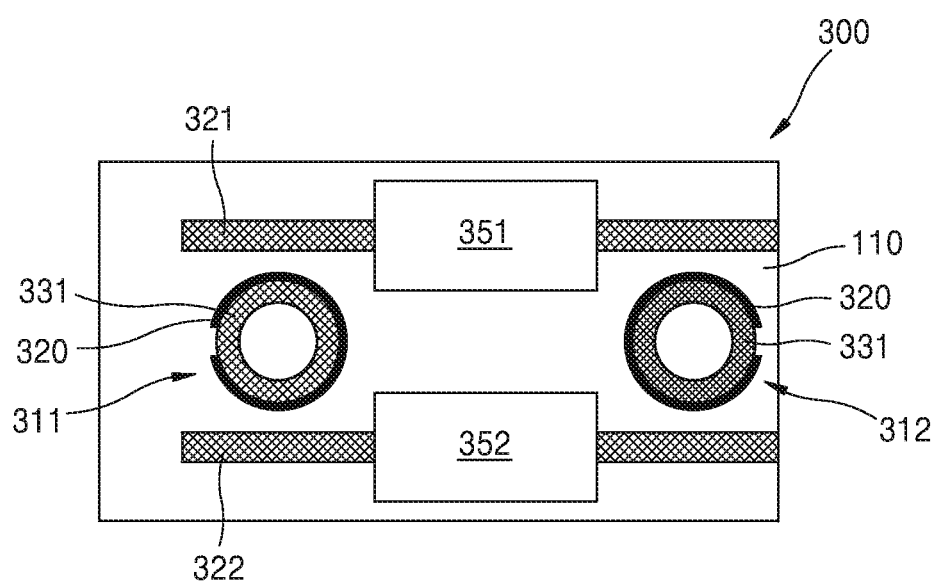
FIG. 5 is a schematic plan view of a tunable laser diode (TLD) according to an embodiment.

FIG. 5 is a schematic plan view of a TLD 300 according to an embodiment.

Referring to FIG. 5, the TLD 300 may include a first waveguide 321 and a second waveguide 322. The first waveguide 321 and the second waveguide 322 may be arranged in parallel to each other. The first waveguide 321 may include a first optical amplifier 351. The second waveguide 322 may include a second optical amplifier 352. The first and second optical amplifiers 351 and 352 may be, for example, semiconductor optical amplifiers or ion-doped amplifiers. The first optical amplifier 351 and the second optical amplifier 352 may function as a light source that generates light. Optical amplifiers will be described later. A first ring resonator 311 and a second ring resonator 312 may be arranged between the first waveguide 321 and the second waveguide 322. The first and second ring resonators 311 and 312 may each include a ring 331, and a heating element 320 surrounding the ring 331 may be arranged around the ring 331. The heating element 320 may be doped with a high-density impurity, and when a voltage is applied to two ends of the heating element 320, heat is generated. Accordingly, a wavelength of light input to the first and second ring resonators 311 and 312 may be changed by applying heat to the light. The heating element 320 may be a region doped with an impurity at a density of about $10^{18}/cm^3$ to about $10^{19}/cm^3$.

Light generated in the first optical amplifier 351 and the second optical amplifier 352 may be amplified by using the first optical amplifier 351 to be output, and then transmitted to the first ring resonator 311. The transmitted light beam may circulate through the first ring resonator 311 and then input to the second waveguide 322. Next, the light beam input to the second waveguide 322 may be amplified by using the second optical amplifier 352 and output to the second waveguide 322. Next, the light beam is transmitted to the second ring resonator 312, and then transmitted again to the first waveguide 321. In this process, a wavelength of light passing through a corresponding ring resonator may be adjusted according to a voltage input to the heating element 320. By repeating the above process, when light of a desired wavelength is generated, the light may be output to the outside through the first waveguide 321 or the second waveguide 322.

The TLD 300 illustrated in FIG. 5 is an example of a light source, and other light sources having other various structures may also be used.

Referring back to FIG. 2, at least one optical amplifier 140 may be further included in the waveguide 121, and configured to amplify the light beam transmitted through the waveguide 121.

The optical amplifier 140 may include a semiconductor optical amplifier or an ion-doped amplifier.

Figure 6:
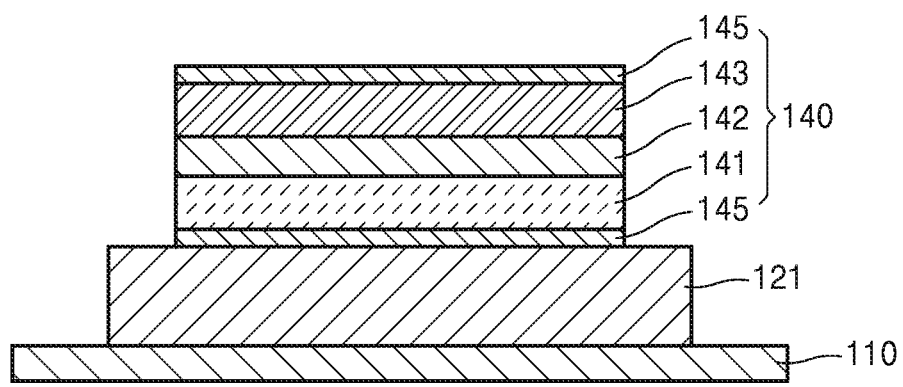
FIG. 6 is a cross-sectional view of an optical amplifier included in the optical phased array of FIG. 2.

FIG. 6 is a cross-sectional view of the optical amplifier 140 included in the first optical phased array 101 of FIG. 2. The optical amplifier 140 may include, for example, a lower cladding layer 141, an active layer 142, and an upper cladding layer 143. The lower cladding layer 141, the active layer 142, and the upper cladding layer 143 may include a Group III-V compound semiconductor material or a Group II-VI compound semiconductor material. The active layer 142 may include, for example, InGaAs, InGaNAs, InGaAsP or InAlGaAs. The lower cladding layer 141 and the upper cladding layer 143 may include a semiconductor material having a band gap that is greater than that of the active layer 142. The lower cladding layer 141 and the upper cladding layer 143 may include, for example, GaAs, GaP, AlGaAs, InGaP, GaAs or InP. A material of the optical amplifier 140 may be selected according to a wavelength of light to be amplified (energy band gap). For example, when amplifying light having a wavelength of 1.55 um, InP/InGaAs may be used in a cladding layer and an active layer.

A conductive layer 145 may be included on each of the lower cladding layer 141 and the upper cladding layer 143. The conductive layer 145 may include a conductive material. Alternatively, the conductive layer 145 may include at least one material selected from the group consisting of Ti, Au, Ag, Pt, Cu, Al, Ni, and Cr, or an alloy thereof, or a stack thereof. However, the material of the conductive layer 145 is not limited thereto, and may also include any one or any combination of indium-tin-oxide (ITO), indium-zinc-oxide (IZO), Ga—In—Zn-oxide (GIZO), Al—Zn-oxide (AZO), Ga—Zn-oxide (GZO), and ZnO. The conductive layer 145 may function as an electrode itself or an additional electrode may be externally coupled to the conductive layer 145.

A semiconductor optical amplifier does not require an additional exciting laser, but may amplify an optical signal by applying an electrical field to two ends of a waveguide. When an electrical field is applied through the conductive layer 145, photon absorption and stimulated emission occur, and as photons are absorbed, electron-hole pairs are generated. On the other hand, when electron-hole pairs combine, stimulated emission of photons is generated. To amplify an optical signal, stimulated emission of photons needs to exceed photon absorption. Examples of the semiconductor optical amplifier include a Fabry-Perot amplifier (FPA) and a travelling wave amplifier (TWA). According to the FPA, density inversion occurs at a conduction band, which is a high energy level, and thus, stimulated emission may occur due to transition to a valence band, which is a low energy level, and light may be amplified by using a resonator. The TWA has anti-reflection coating on both end faces of a semiconductor laser to thereby reduce reflection on an emission surface, and reduce resonance to thereby widen a gain bandwidth, compared with the FPA.

The optical amplifier 140 may have a larger width than the waveguide 121. Accordingly, leakage of light that has been transmitted through the waveguide 121 and is proceeding towards the optical amplifier 140 may be reduced.

Figure 7:
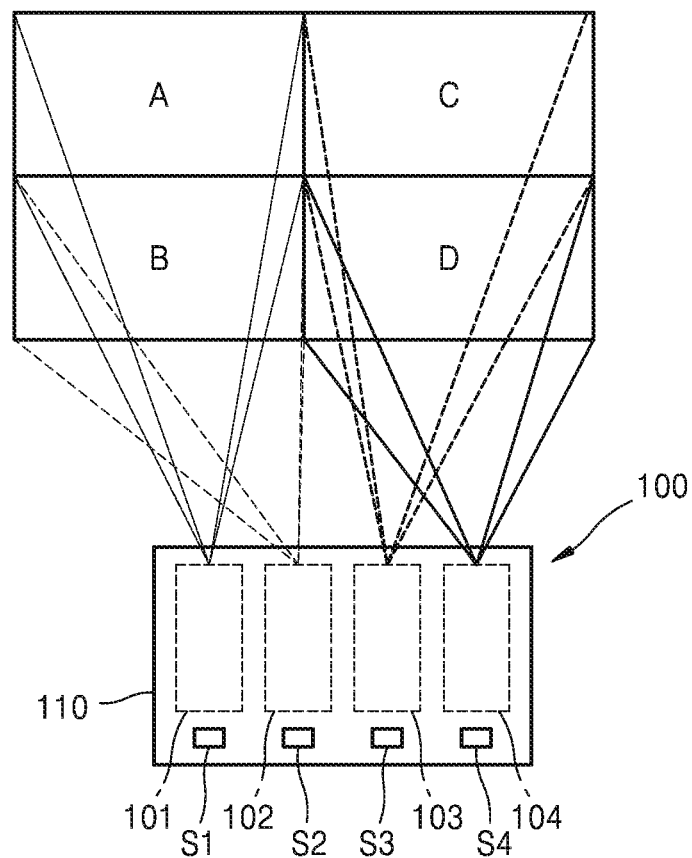
FIG. 7 is a schematic diagram for explaining an operation of the beam steering device of FIG. 1, according to an embodiment.

FIG. 7 is a schematic diagram for explaining an operation of the beam steering device 100 of FIG. 1, according to an embodiment. Referring to FIG. 7, a plurality of optical phased arrays may have different view angle ranges. For example, the first optical phased array 101 may have a first view angle range to adjust an output direction of a light beam, and the second optical phased array 102 may have a second view angle range to adjust an output direction of a light beam. The third optical phased array 103 may have a third view angle range to adjust an output direction of a light beam, and the fourth optical phased array 104 may have a fourth view angle range to adjust an output direction of a light beam.

For example, a light beam output from the first optical phased array 101 may be irradiated to region A; a light beam output from the second optical phased array 102 may be irradiated to region B; a light beam output from the third optical phased array 103 may be irradiated to region C; and a light beam output from the fourth optical phased array 104 may be irradiated to region D. A proceeding direction of light beams may be adjusted by each of the optical phased arrays. A light beam may be steered in a horizontal direction with respect to the substrate 110 in accordance with phase modulation of the optical phased arrays. In addition, beam steering may be performed in a thickness direction with respect to the substrate 110, according to a structure of the antenna AT of the optical phased arrays. In this manner, the light beam may be scanned in a horizontal direction and a thickness direction. By differently adjusting scanning ranges of the plurality of optical phased arrays, respectively, a total scanning range may be extended.

In addition, by adjusting a wavelength of a light source, a light beam may be steered in a thickness direction of the substrate 110. For example, when the first to fourth light sources S1, S2, S3, and S4 are TLDs, a wavelength may be adjusted to adjust a proceeding direction of light in a thickness direction of the substrate 110 by using each of optical phased arrays. A steering range of a light beam may be extended in a longitudinal direction (thickness direction of the substrate 110) through cooperation between the light source and the antenna AT of the optical phased arrays.

Figure 8:
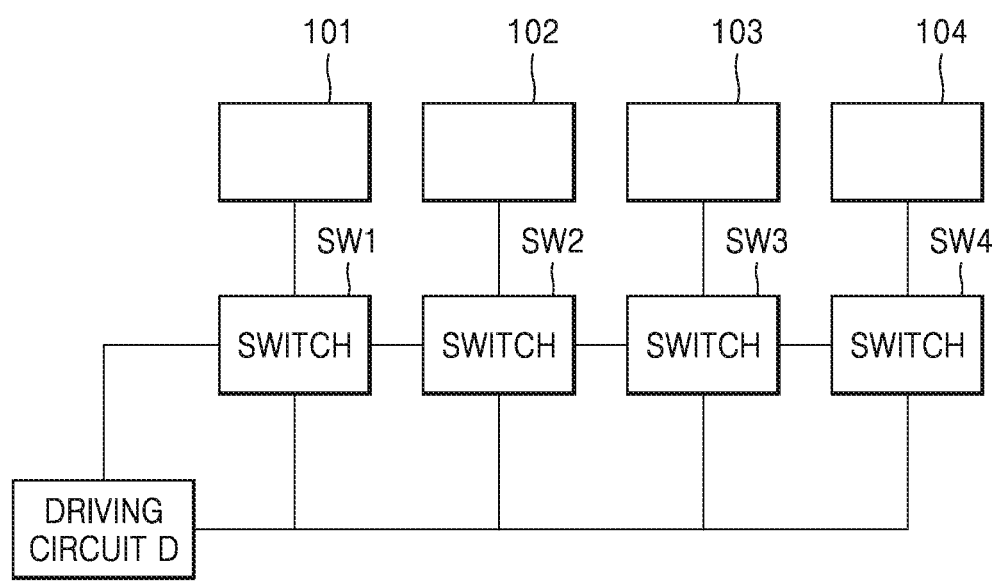
FIG. 8 is a schematic diagram of a driving device of a beam steering device according to an embodiment.

FIG. 8 is a schematic diagram of a driving device of a beam steering device according to an embodiment. The driving device may include a driving circuit D and first to fourth switches SW1, SW2, SW3, and SW4 that turn on and off an operation of each optical phased array. A scanning range of a light beam may be selected by selectively opening and closing the first to fourth switches SW1, SW2, SW3, and SW4. The first to fourth optical phased arrays 101, 102, 103, and 104 may be sequentially or simultaneously operated by using the first to fourth switches SW1 to SW4.

Figure 9:
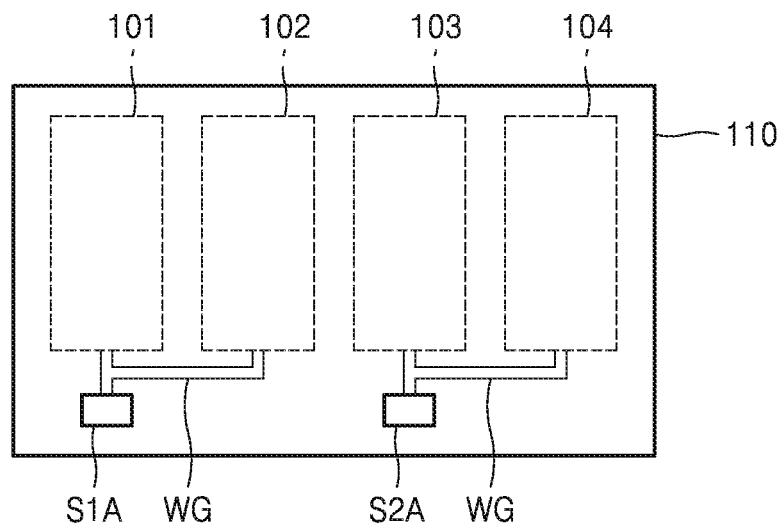
FIG. 9 is a schematic diagram of a beam steering device according to another embodiment.

FIG. 9 is a schematic diagram of a beam steering device according to another embodiment. FIG. 9 illustrates an example in which two optical phased arrays are configured to correspond to one light source. For example, the first to fourth optical phased arrays 101, 102, 103, and 104 may be provided on the substrate 110, and a light beam irradiated from a first light source S1A may be supplied to the first optical phased array 101 and the second optical phased array 102. A light beam irradiated from the second light source S2A may be supplied to the third optical phased array 103 and the fourth optical phased array 104. A waveguide WG may be further provided between the first light source S1A and the first optical phased array 101 and between the first light source S1A and the second optical phased array 102. A waveguide WG may be further provided between the second light source S2A and the third optical phased array 103 and between the second light source S2A and the fourth optical phased array 104. By varying a wavelength of the first light source S1A, a light beam may be scanned in a longitudinal direction. As the first optical phased array 101 and the second optical phased array 102 jointly use the first light source S1A, the first optical phased array 101 and the second optical phased array 102 may have a same scanning range in the longitudinal direction. However, the scanning range may also vary according to a structure of the antenna AT (see FIG. 1) of the first optical phased array 101 and the second optical phased array 102.

Figure 10:
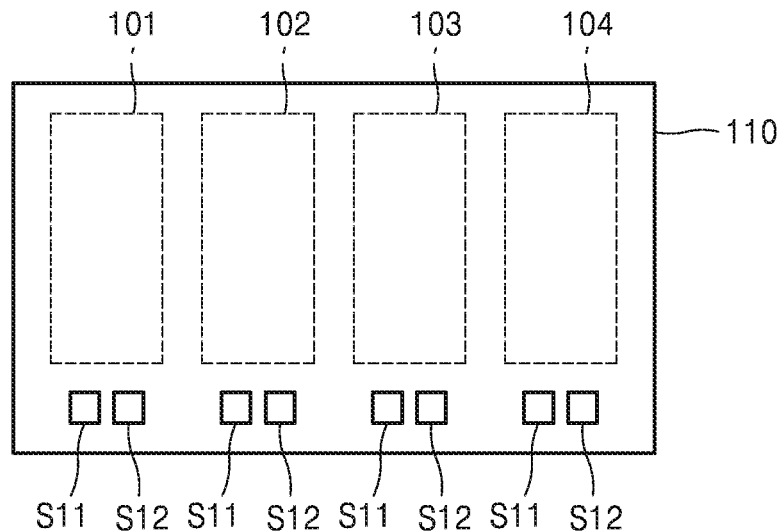
FIG. 10 is a schematic diagram of a beam steering device according to another embodiment.

FIG. 10 is a schematic diagram of a beam steering device according to another embodiment. FIG. 10 illustrates an example in which two light sources are configured to correspond to one optical phased array. For example, the first to fourth optical phased arrays 101, 102, 103, and 104 may be provided on the substrate 110, and a first light source S11 and a second light source S12 may be respectively included to correspond to each of the first to fourth optical phased arrays 101, 102, 103, and 104. When two light sources are included with respect to one optical phased array and have different variable wavelength ranges, a scanning range in a longitudinal direction according to variation in wavelengths may be extended. Here, the first light source S11 and the second light source S12 are arranged close to an optical phased array, to which they correspond, and a waveguide may not have to be additionally provided accordingly.

Figure 11:
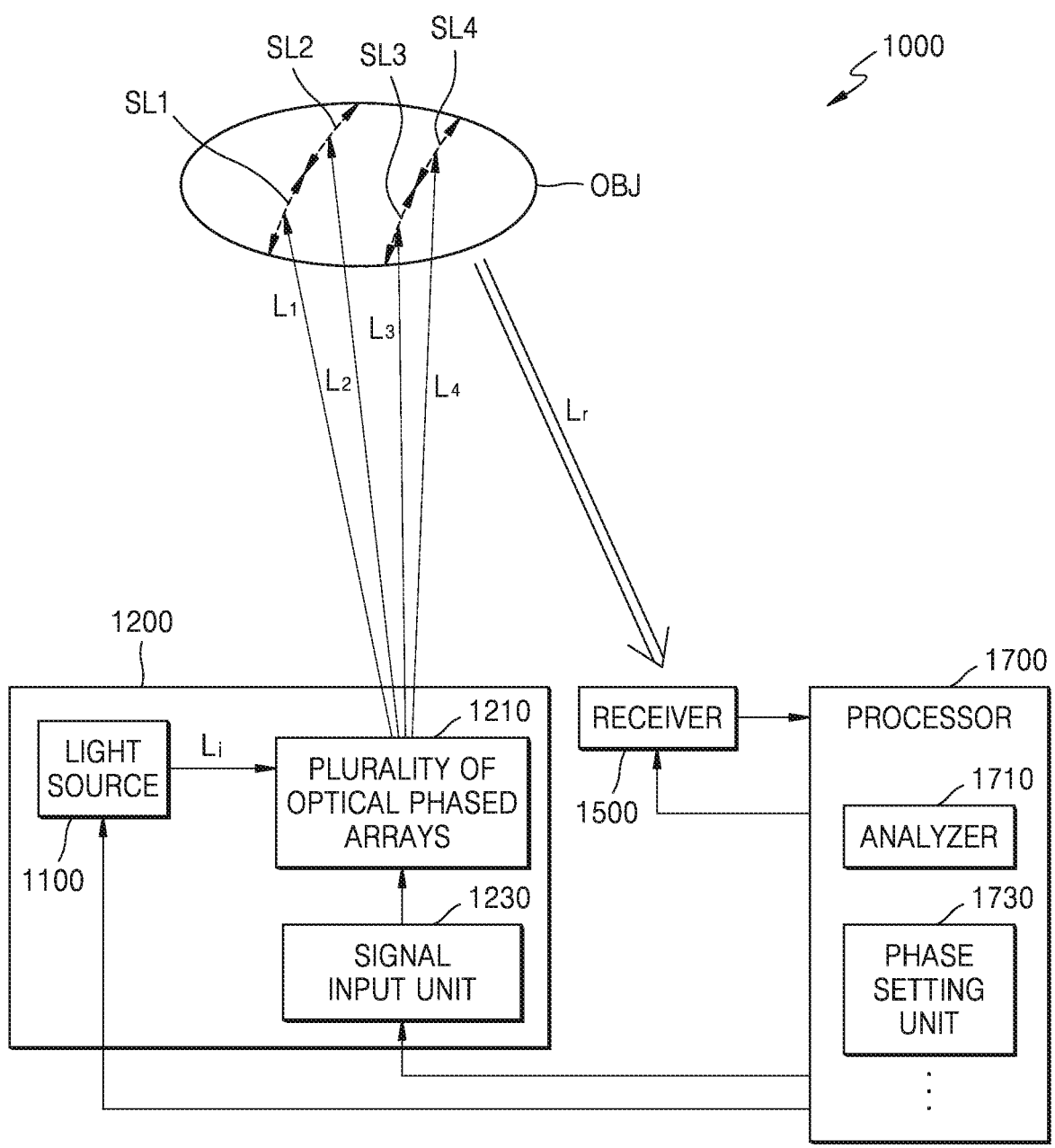
FIG. 11 is a schematic diagram of a system according to an embodiment.

FIG. 11 is a schematic diagram of a system 1000 according to an embodiment.

The system 1000 may include a beam steering device 1200 controlling a proceeding direction of a light beam (i.e., a first light beam), a receiver 1500 receiving light (i.e., a second light beam) reflected by an object OBJ, and a processor 1700 analyzing a distribution of light received by the receiver 1500 according to locations and/or over time and sorting and processing the light irradiated onto the object OBJ in a plurality of directions.

The beam steering device 1200 may include a light source 1100 and a plurality of optical phased arrays 1210 that modulate a phase of a light beam $L_i$ from the light source 1100 and emit the light beam toward the object OBJ in a plurality of directions. The beam steering device 1200 may be applied to the embodiments described with reference to FIGS. 1 through 10.

The light source 1100 may irradiate the light beam $L_i$ to be used in analyzing a position and shape of the object OBJ. The light source 1100 generates and irradiates light of a predetermined wavelength. Examples of the light source 100 include an LD, an LED, an SLD or a TLD that generate light having a wavelength band suitable for analyzing a position and shape of the object OBJ, for example, infrared light. The light source 1100 may generate and irradiate light of a plurality of different wavelength bands. The light source 1100 may generate and irradiate pulse light or continuous light.

The optical phased arrays 1210 may adjust a direction of light by modulating a phase of an incident light beam. Further, a signal input unit 1230 applying a modulation signal to each of the optical phased arrays may be included.

The optical phased arrays 1210 are controlled by the processor 1700, and proceeding directions of light beams $L_1$, $L_2$, $L_3$, and $L_4$ in a plurality of directions may be respectively adjusted. The optical phased arrays 210 may scan the object OBJ along a plurality of scanning directions SL1, SL2, SL3, and SL4 simultaneously or sequentially. When scanning is performed simultaneously, the object OBJ may be scanned at a higher speed. The receiver 1500 may include a plurality of light detecting elements sensing reflected light $L_r$ from the object OBJ. The processor 1700 may control overall operation of system 1000. The processor 1700 may include an analyzer 1710 analyzing a distribution of light received by the receiver 1500 according to positions and/or over time, and sorting and processing light beams irradiated to the object OBJ from the optical phased arrays 1210 in a plurality of directions.

The processor 1700 may also include a phase setting unit 1730 setting a phase profile and controlling the signal input unit 1230 according to the phase profile, to set a plurality of directions of light emitted from the optical phased arrays 1200. The processor 1700 may also control operation of the light source 1100 and the receiver 1500. For example, the processor 1700 may perform power supply control, on/off control, or control generation of pulse wave (PW) or continuous waves (CW) with respect to the light source 1100. In addition, the processor 1700 may apply a control signal with respect to each of the light detecting elements of the receiver 1500.

Figure 12:
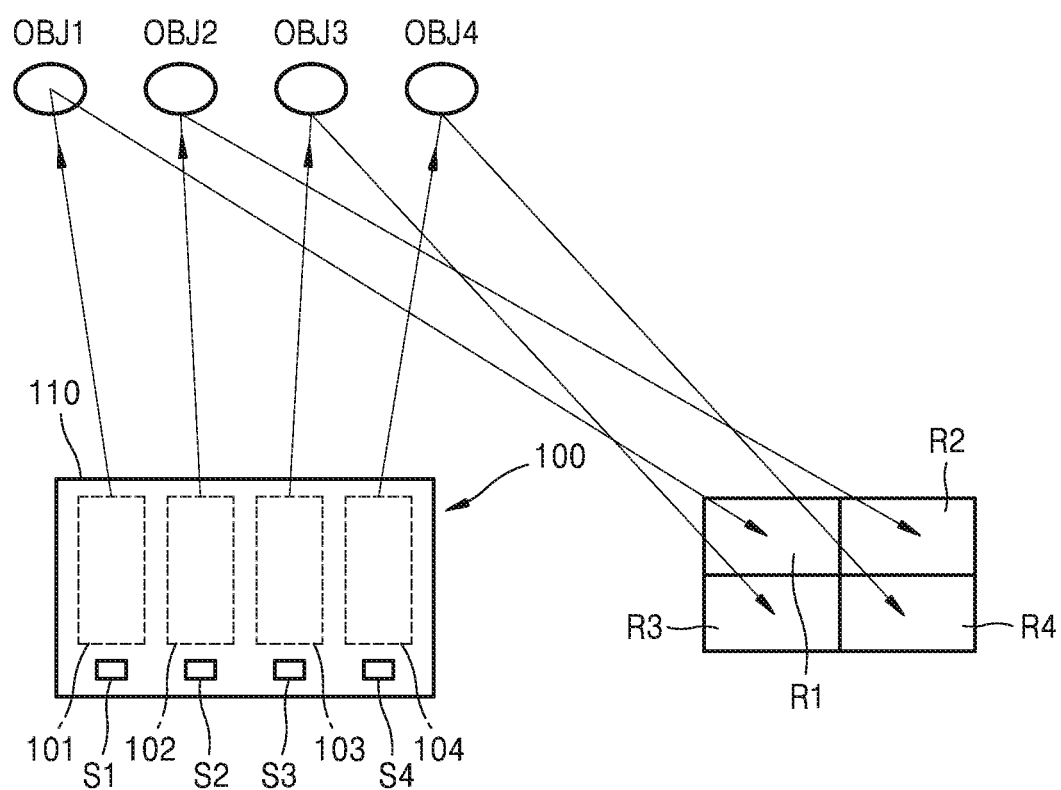
FIG. 12 is a schematic diagram of a system according to another embodiment.

FIG. 12 is a schematic diagram of a system according to another embodiment. FIG. 12 illustrates an example in which a plurality of light detecting elements is applied to a system according to various embodiments. Different scanning ranges may be set by the first to fourth optical phased arrays 101, 102, 103, and 104 of the beam steering device 100 illustrated in FIG. 1. In other words, each of the first to fourth optical phased arrays 101, 102, 103, and 104 may have different angles of view. For example, a first object OBJ1 may be scanned by the first optical phased array 101; a second object OBJ2 may be scanned by the second optical phased array 102; a third object OBJ3 may be scanned by a third optical phased array 103; and a fourth object OBJ4 may be scanned by the fourth optical phased array 104. Here, the first through fourth objects OBJ1, OBJ2, OBJ3, and OBJ4 may be independent targets. However, the disclosure is not limited thereto, and the first to fourth objects OBJ1, OBJ2, OBJ3, and OBJ4 may be a plurality of regions corresponding to different view angle ranges with respect to a single object. First to fourth light detecting elements R1, R2, R3, and R4 respectively corresponding to the first to fourth optical phased arrays 101, 102, 103 and 104 may be included. Light beams irradiated from the first to fourth optical phased arrays 101, 102, 103, and 104 and reflected by the first to fourth objects OBJ1, OBJ2, OJB3, and OJB4 may be respectively detected by the first through fourth light detecting elements R1, R2, R3, and R4, to which the light beams respectively correspond. As described above, when light detecting elements are provided to respectively correspond to optical phased arrays, the optical phased arrays may be driven simultaneously to scan an object. Thus, an area of a broad range may be scanned quickly by using the system according to the present embodiment.

The beam steering device according to the various embodiments may be applied to Light Detection and Ranging (LiDAR). LiDAR may detect a distance of a target to an object, a direction, a speed, a temperature, a material distribution and concentration characteristics of the target by irradiating a laser to the target. LiDAR may be used in laser scanners and 3D video cameras for autonomous vehicles.

Examples of LiDAR include LiDARs for vehicles, LiDAR for robots, LiDAR for drones, and the like. In addition, the beam steering device according to the various embodiments may be used, for example, for security intruder detection systems, subway screen door obstacle detection systems, depth sensors, user face recognition sensors of mobile phones, augmented reality (AR), or motion detection or object profiling in TVs or game devices.

As is traditional in the field of the inventive concepts, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

It may be understood that the embodiments described herein may be considered in a descriptive sense only and not for purposes of limitation. Descriptions of features or aspects within each embodiment may be considered as available for other similar features or aspects in other embodiments.

While the embodiments have been described with reference to the figures, it will be understood by those of ordinary skill in the art that various changes in form and details may be made therein without departing from the spirit and scope as defined by the following claims.

What is claimed is:

1. A system comprising:
   a substrate;
   at least one light source disposed on the substrate and configured to irradiate at least one light beam;
   optical phased arrays disposed on a same plane of the substrate and configured to adjust a direction of the at least one light beam that is irradiated, to output a first plurality of light beams to an object, wherein each of the optical phased arrays has a different view angle range and comprises:
     a waveguide through which the at least one light beam that is irradiated is transmitted;
     a beam splitter configured to split the at least one light beam transmitted through the waveguide; and
     a phase shifter configured to shift a phase of the at least one light beam that is split; and
   light detecting elements configured to detect a second plurality of light beams that are reflected by the object to which the first plurality of light beams is output, wherein the light detecting elements respectively correspond to the optical phased arrays.

2. The system of claim 1, wherein each of the optical phased arrays is independently operated, and wherein each of the second plurality of light beams is detected using a respective one of the light detecting elements that corresponds to a respective one of the optical phased arrays.

3. The system of claim 1, further comprising an antenna including a grating configured to adjust the direction of the at least one light beam of which the phase is shifted.

4. The system of claim 1, wherein each of the optical phased arrays comprises an optical amplifier configured to amplify the at least one light beam transmitted through the waveguide.

5. The system of claim 1, wherein the phase shifter comprises:
   a portion of the waveguide disposed on the substrate; and
   a cladding layer disposed on the portion of the waveguide and configured to modulate the phase of the at least one light beam that is split, based on an electrical signal, wherein the cladding layer comprises an oxide semiconductor.

6. The system of claim 1, wherein the at least one light source is further configured to emit a laser beam having a convertible wavelength.

7. The system of claim 1, wherein the at least one light source comprises a plurality of lights sources respectively corresponding to the optical phased arrays.

8. The system of claim 1, wherein the at least one light sources comprises one light source that is jointly used with respect to the optical phased arrays.

9. The system of claim 1, wherein the at least one light source comprises a plurality of light sources that are combined to be used with respect to one of the optical phased arrays.

10. The system of claim 1, wherein each of the first plurality of light beams is output to a different region adjacent to the object.

11. The system of claim 1, wherein each of the first plurality of light beams is output along a different scanning direction on the object.

12. The system of claim 1, wherein the at least one light sources comprises:
   a first waveguide disposed on the substrate;
   a second waveguide disposed on the substrate and in parallel to the first waveguide;
   a first optical amplifier disposed on the first waveguide;
   a second optical amplifier disposed on the second waveguide, the first optical amplifier being configured to generate and amplify light;
   a first ring resonator and a second ring resonator that are disposed on the substrate and interposed between the first waveguide and the second waveguide, each of the first ring resonator and the second ring resonator comprising:
     a ring; and
     a heating element surrounding the ring,
   wherein the first ring resonator is configured to generate heat to change a wavelength of the light amplified by the first optical amplifier,
   the second optical amplifier is configured to amplify the light of which the wavelength is changed by the first ring resonator, and
   the second ring resonator is configured to generate heat to change the wavelength of the light amplified by the second optical amplifier.

13. The system of claim 4, wherein the optical amplifier comprises:
   a first conductive layer;

a lower cladding layer disposed on the first conductive layer;
an active layer disposed on the lower cladding layer;
an upper cladding layer disposed on the active layer, each of the lower cladding layer and the upper cladding layer comprising a semiconductor material having a band gap that is greater than that of the active layer; and
a second conductive layer disposed on the upper cladding layer.

* * * * *